W. J. GREB.
FLOAT VALVE.
APPLICATION FILED JUNE 28, 1919.
1,355,663.
Patented Oct. 12, 1920.
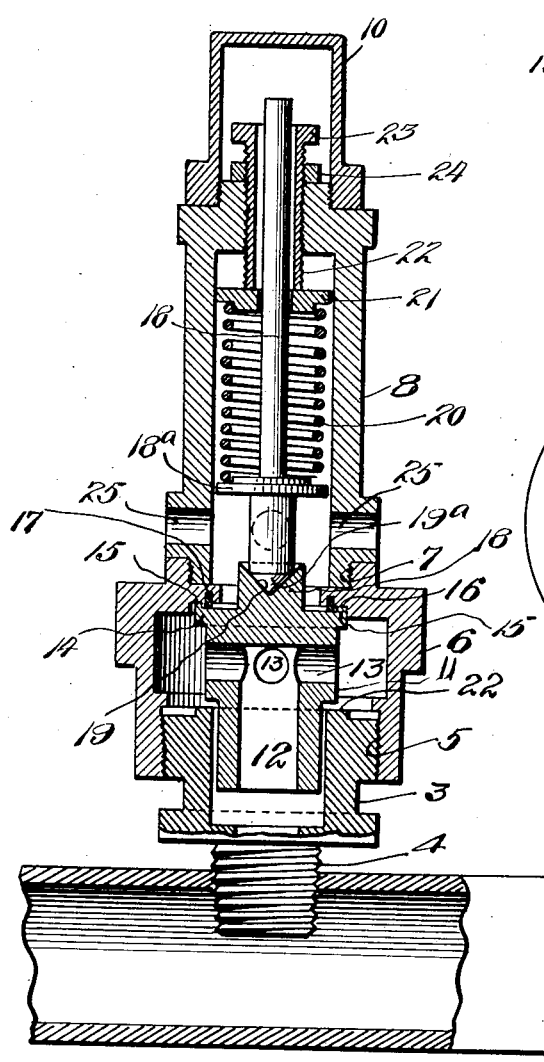
Inventor.
W<sup>m</sup> J. GREB.

UNITED STATES PATENT OFFICE.

WILLIAM J. GREB, OF EASTON, PENNSYLVANIA.

FLOAT-VALVE.

1,355,663.   Specification of Letters Patent.   Patented Oct. 12, 1920.

Original application filed February 28, 1919, Serial No. 279,733. Divided and this application filed June 28, 1919. Serial No. 307,465.

*To all whom it may concern:*

Be it known that I, WILLIAM J. GREB, a citizen of the United States, residing at Easton, in the county of Northampton and State of Pennsylvania, have invented certain new and useful Improvements in Float-Valves, of which the following is a specification, reference being had therein to the accompanying drawings.

This invention relates to float valves, and more particularly to a valve used in an air brake signal, per my original United States application for Letters Patent, Serial No. 279,733, filed February 28, 1919, of which case this application relating to the float valve is a division.

The object of the invention is the construction of a simple and efficient float valve used in my improved signal, which will be positive and efficient in operation and comparatively inexpensive to manufacture.

With this and other objects in view, my invention comprises certain novel combinations, constructions, and arrangements of parts as will be hereinafter specifically described, illustrated in the accompanying drawings, and more particularly pointed out in the appended claim.

In the drawings,

Figure 1 is a vertical, sectional view of a signal, showing my float valve in an assembled position therewith.

Fig. 2 is a perspective view of my float valve.

Referring to the drawings by numerals, 1 designates a supply pipe that may communicate with air brakes and a pressure tank, and suitably connected in communication with the supply pipe 1 is a gage 2.

My improved signaling device or apparatus comprises a base or inner section 3 having a threaded portion 4, threaded into the supply pipe 1, and the inner section is exteriorly threaded at 5, and threaded upon this portion 5 is the intermediate section 6, and threaded into the intermediate section 6 at 7 is the outer section 8. Threaded at 9, upon the outer section 8, is the cap 10. A "float" valve 11 is mounted in the inner casing 3 and the intermediate casing 6. The valve 11 is provided with a longitudinally-extending passage 12 communicating with a plurality of laterally-extending outlets or apertures 13. The upper portion 14 overhangs the sides of the valve casing 11, and a short upstanding annular valve seat-engaging ring 15 is formed upon the overhanging portion 14; this ring 15 engages valve seat 16. An annular rubber ring 17 is secured in the top of section 6 and engages portion 14 just inside of ring 15, providing a tight closure. Extension 18 projects above the ring 15 and has socket 19 for receiving the lower pointed end 19$^a$ of the plunger rod 18.

The plunger rod 18 is provided with an integral disk-like portion 18$^a$, that has a shoulder upon its upper or outer face and around which shoulder fits the inner end of coil spring 20. A disk 21, similar to disk 18$^a$, is loosely mounted upon the rod 18, and around the shoulder portion of this disk 21 the outer or upper end of coil spring 20 fits. This disk 21 constitutes a follower and is used to press upon the spring 20 for controlling the tension thereof. A hollow sleeve 22 is exteriorly threaded into the outer end of the outer section 8, and presses at its inner end upon the outer face of the follower or disk 21. This sleeve 22 has at its outer end a suitable portion 23 for receiving a wrench, and on the sleeve 22 between the outer end of the outer section 8 and the portion 23 is a lock nut 24, whereby, when the sleeve 22 has been adjusted to the desired position for sufficiently controlling the tension on spring 20, the lock nut 24 can be screwed down against the outer end of the section 8, and positively retain the sleeve 22 in its adjusted position.

To protect the outer end of the plunger rod 18, extension 23 and nut 24, I thread upon the outer end of the outer section the cap 10.

Near the inner end of the outer section 8, I provide a plurality of outlet openings 25 for permitting the escape of air. The operation of the signal is as follows: If the device is to be set for indicating when the pressure in a source of supply has fallen below forty pounds, the sleeve 22 is adjusted so that the tension on spring 20 will cause the spring to force inwardly or downwardly valve 11, away from valve seat 16, permitting the air, or liquid (whichever is in the source of supply) to pass through the central passage 12, outlets 13, thence by the valve seat 16 and out through the outlets or apertures 25. As long as the pressure in the source of supply, and the supply pipe 1, remains above the predetermined point, say forty pounds, then the strength of the spring 20 is overcome, and the pressure in the supply pipe 1 is sufficient for holding the valve 11 in its seated position, as shown in Fig. 1, keeping the outlets or ports closed so that no liquid or air will escape to indicate a low pressure.

It is to be understood that the inner, intermediate, and outer sections constitute a casing, and that in this casing are valve means engaged by a spring-pressed plunger for unseating the valve means at predetermined intervals; the specific, novel structure of this type of a casing, valve means, and the unseating spring-controlled means being hereinbefore specifically described.

I wish it to be understood that I reserve the right to make such minor alterations and modifications as shall appear to one skilled in the art to which this invention relates, which changes or alterations fall fairly within the scope of the appended claim.

What I claim is:

A float valve comprising a body having a longitudinally-extending passage, said body provided with a lower open end, and a closed upper end, said body provided with laterally-extending openings formed in its sides and communicating with said longitudinally-extending passage, said body having an outwardly-extending upper portion overhanging its sides, a short upstanding valve-seat-engaging ring formed upon the outer edge of the overhanging portion, and a central extension on the body and extending above the ring and provided with a plunger-receiving socket in its outer end, substantially as shown and described.

In testimony whereof I hereunto affix my signature.

WILLIAM J. GREB.